(12) United States Patent (10) Patent No.: US 9,183,431 B2
Kim et al. (45) Date of Patent: Nov. 10, 2015

(54) APPARATUS AND METHOD FOR PROVIDING ACTIVITY RECOGNITION BASED APPLICATION SERVICE

(71) Applicant: Electronics and Telecommunications Research Institute, Daejeon (KR)

(72) Inventors: Do-Hyung Kim, Daejeon (KR); Jae Hong Kim, Daejeon (KR); Kye Kyung Kim, Daejeon (KR); Youngwoo Yoon, Daejeon (KR); Woo han Yun, Daejeon (KR); Ho sub Yoon, Daejeon (KR); Jae Yeon Lee, Daejeon (KR); Suyoung Chi, Daejeon (KR); Young-Jo Cho, Daejeon (KR); Kyu-Dae Ban, Daejeon (KR); Jong-Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/162,177

(22) Filed: Jan. 23, 2014

(65) Prior Publication Data

US 2015/0092981 A1 Apr. 2, 2015

(30) Foreign Application Priority Data

Oct. 1, 2013 (KR) ........................ 10-2013-0117373

(51) Int. Cl.
*G06K 9/00* (2006.01)
*G06K 9/62* (2006.01)
*G06K 9/46* (2006.01)

(52) U.S. Cl.
CPC .......... *G06K 9/00342* (2013.01); *G06K 9/6269* (2013.01); *G06K 2009/4666* (2013.01)

(58) Field of Classification Search
CPC ..... G06K 9/6255; G06K 9/6256; G06K 9/66; G06K 9/4628; G06K 9/3241; G06K 9/3233; G06K 9/00777; G06K 9/6272; G06K 9/6281; G06K 9/6216; G06T 2207/10016; G06T 15/00; H04N 13/02
See application file for complete search history.

(56) References Cited

U.S. PATENT DOCUMENTS

| | | | | |
|---|---|---|---|---|
| 8,503,765 B2 * | 8/2013 | Woo et al. | | 382/154 |
| 8,718,356 B2 * | 5/2014 | Appia et al. | | 382/154 |
| 8,788,973 B2 * | 7/2014 | Lavigne et al. | | 715/848 |
| 8,861,800 B2 * | 10/2014 | Savvides et al. | | 382/118 |
| 8,917,905 B1 * | 12/2014 | Dill | | 382/103 |
| 2010/0277504 A1 * | 11/2010 | Song | | 345/633 |
| 2011/0148875 A1 | 6/2011 | Kim et al. | | |
| 2012/0257795 A1 * | 10/2012 | Kim et al. | | 382/106 |
| 2013/0022262 A1 * | 1/2013 | Baele et al. | | 382/154 |
| 2013/0044912 A1 * | 2/2013 | Kulkarni et al. | | 382/103 |
| 2013/0100140 A1 * | 4/2013 | Ye et al. | | 345/473 |

(Continued)

FOREIGN PATENT DOCUMENTS

JP 2012-226595 11/2012
KR 10-2013-0018004 2/2013

*Primary Examiner* — Amir Alavi
(74) *Attorney, Agent, or Firm* — Kile Park Reed & Houtteman PLLC (57) ABSTRACT

An apparatus includes an image receiving module configured to collect a depth image provided from a camera, a human body detection module configured to detect a human body from the collected depth image, and an activity recognition module configured to recognize an action of the human body on the basis of a 3-dimensional action volume extracted from the human body and a previously learned action model.

12 Claims, 6 Drawing Sheets

(56) References Cited

U.S. PATENT DOCUMENTS

2013/0162637 A1* 6/2013 Son .............................. 345/419
2013/0321580 A1* 12/2013 Chou et al. ..................... 348/46
2014/0333522 A1* 11/2014 Gotschlich .................... 345/156

* cited by examiner

APPARATUS AND METHOD FOR PROVIDING ACTIVITY RECOGNITION BASED APPLICATION SERVICE

RELATED APPLICATIONS

This application claims the benefit of Korean Patent Application No. 10-2013-0117373, filed on Oct. 1, 2013, which is hereby incorporated by reference in its entirety (as if fully set forth herein).

FIELD OF THE INVENTION

The present invention relates to a technology of providing an activity recognition based application service, more specifically, to an apparatus and method for providing an activity recognition based application service, which is suitable to recognize a designated action of a user and to provide an edutainment program on the basis of the recognized result.

BACKGROUND OF THE INVENTION

As well-known in the art, a method for recognizing motion, gesture, posture and action of a human body (a human) from an image obtained from a two-dimensional (2D) or three-dimensional (3D) camera has been studied for a long time, and it offers a variety of applications.

A study on posture and action of a human in a two-dimensional image may be mainly applied to indexing, editing and searching of video, and also widely applied to a CCTV monitoring field to recognize an abnormal action pattern such as trespassing, hanging around, assaulting and fainting and generate a warning message.

Since Microsoft has launched Xbox 360 game platform having an inexpensive 3-dimensional camera called Kinect in 2010, a study to estimate a human body posture and recognize a human action from a 3D image obtained from a three-dimensional camera has been actively progressed for recent several years, and its typical application fields may be as follows:

1. Multiplayer game based on motion and posture, recognition information, represented by Xbox avail from Microsoft,
2. Natural user interface based on body part tracking and gesture recognition information,
3. Posture correction system based on motion and posture recognition information,
4. Action pattern analysis system based on motion, posture and object recognition information, and
5. Educational program based on simple action recognition information.

As described above, since the inexpensive 3-dimensional camera came into wide use, it became more easy to extract motion and posture information of the people comparatively close (for example, within 3 meters) to the camera, compared to the past. Accordingly, a variety of application systems are under development and the edutainment field aimed by the present invention is also no exception.

However, all edutainment programs in the art are very simple ones, that estimate whether or not actions occur and postures by tracking positions of user's arm and leg and provide multiplayer contents based on such information. These programs may be considered to be very elementary level in view of educational effect and entertainment quality.

SUMMARY OF THE INVENTION

In view of the above, the present invention provide an apparatus and method capable of providing an intelligent application service model of a higher level based on an explicit activity recognition, rather than a simple game and educational program in the art that makes use of user motion and posture information only.

The subject to be solved by the present invention is not limited to the above described one, and other subjects to be solved that were not mentioned here will be clearly understood by those skilled in the art from the following description.

In accordance with an embodiment of the present invention, there is provided an apparatus for providing an activity recognition based application service, which includes an image receiving module configured to collect a depth image provided from a camera, a human body detection module configured to detect a human body from the collected depth image, and an activity recognition module configured to recognize an action of the human body on the basis of a 3-dimensional action volume extracted from the human body and a previously learned action model.

In the exemplary embodiment, the activity recognition module may recognize the action of the human body using an SVM (Support Vector Machine) classifier.

In the exemplary embodiment, the activity recognition module may includes an action volume generation unit configured to generate the 3-dimensional action volume by accumulating all the depth images from when the human body starts to take an action until the human body ends to take an action, a normalization unit configured to normalize the generated 3-dimensional action volume in a predetermined scale, a feature extraction unit configured to extract a feature of each action volume by comparing depth values of each pixel for the normalized 3-dimensional action volume one another, an action learning DB configured to store a learning feature and an action label for the previously learned action model, and an activity recognition unit configured to compare the extracted feature and the learning feature of the previously learned action model in the action learning DB and determine the action label of the most similar learning feature to the extracted feature as an action of the human body.

In the exemplary embodiment, the action volume generation unit may generates the 3-dimensional action volume using the following equation, $$V(i,j,t) = \begin{cases} D(i,j,t), & \text{if } V(i,j,t-1) = 0 \\ \min(D(i,j,t), V(i,j,t-1)), & o \cdot w \end{cases}$$

where V(i,j,t) denotes a depth value of the action volume depth image in its position (i,j) at a time point t, and D(i,j,t) denotes a depth value of the input depth image in its position (i,j) at a time point t.

In the exemplary embodiment, the action volume generation unit may generate the 3-dimensional action volume in all positions where the D(i,j,k) is not zero (0).

In the exemplary embodiment, the feature extraction unit may extract the feature using a 3D LBP (Local Binary Pattern).

In the exemplary embodiment, the previously learned action model may be generated using an SVM (Support Vector Machine) learning classifier.

In accordance with another aspect of the exemplary embodiment of the present invention, there is provided a method for providing an activity recognition based application service, which includes collecting a depth image, detecting a human body from the collected depth image, detecting a 3-dimensional action volume from the human body, and recognizing an action of the human body on the basis of the detected 3-dimensional action volume and a previously learned action model.

In the exemplary embodiment, said recognizing an action of the human body may includes generating the 3-dimensional action volume by accumulating all the depth images from when the human body starts to take an action until the human body ends to take an action, normalizing the generated 3-dimensional action volume in a predetermined scale, extracting a feature for each action volume by comparing depth values of each pixel for the normalized 3-dimensional action volume one another, and comparing the extracted feature and a learning feature of the previously learned action model each other and determining an action label of the most similar learning feature to the extracted feature as an action of the human body.

BRIEF DESCRIPTION OF THE DRAWINGS

The patent application file contains at least one drawing executed in color. Copies of this patent or patent application publication with color drawings will be provided by the Office upon request and payment of the necessary fee.

The above and other objects and features of the present invention will become apparent from the following description of embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Hereinafter, embodiments of the present invention will be described in detail with reference to the accompanying drawings.

First, in order to leave no room for confusion in describing embodiments of the present invention, each term is defined as follows.

1. Motion (or movement) recognition: sensing whether any movement has been occurred at a specific position in a sequence image (for example, a motion has been occurred at a designated area of left upper portion of a screen).

2. Gesture recognition: recognizing the meaning of gesture in a sequence image as a nonverbal communication shape (for example, a movement to raise and swing hands back and forth repeatedly means a calling gesture).

3. Posture recognition: recognizing a specific shape made of joints and bones in a still image (for example, a posture in which a golf club impacts a ball when performing a golf swing, a posture of raising both hands up).

4. Activity recognition: recognizing a specific behavior composed of a group of a series of postures in a sequence image (for example, an action to pick up a fallen thing, an action to go out and kick a ball, an action to eat a banana, etc.)

Embodiment

Figure 1:
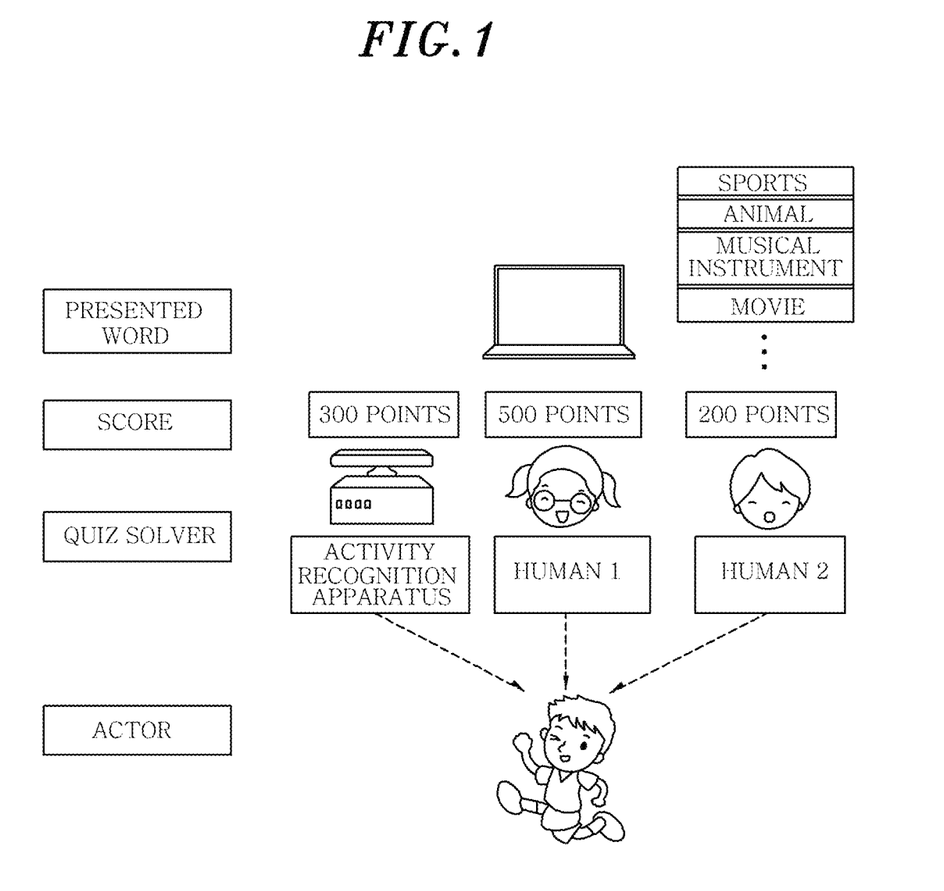
FIG. 1 is a conceptual diagram of a quiz program based on activity recognition information.

FIG. 1 is a conceptual diagram of a quiz program based on activity recognition information.

As illustrated in this drawing, FIG. 1 shows a quiz program in which an application service apparatus based on activity recognition information of the present invention is applied. A scenario of the quiz program based on such activity recognition information is as simple as described below.

First, when a quiz starts, an actor looks at a presented word (i.e.g, a quiz) and takes an action that is considered to represent the presented word. For example, as shown in FIG. 1, when a presented word is a "soccer", the actor may take an action to take a shot or to dribble the ball.

Accordingly, a plurality of quiz solvers inclusive of an activity recognition apparatus suggests an answer after looking at the action, and score is given to a person who makes a correct answer first. The problem area including the presented word may be any field if it can be expressed by taking an action, for example, sports, animals, musical instruments, movies, etc.

While the scenario of such quiz program is similar to that of the existing so-called speed quiz, it may be possible to provide an advanced type of new edutainment program that has not been existed in the world by introducing an activity recognition apparatus.

Meanwhile, although the "activity recognition information based quiz program" has been described as an embodiment for the convenience of explanation and increased understanding, the present invention is not necessarily limited to the embodiment. Further, it goes without saying that the present invention may be widely applied to any edutainment programs constructed of methods and apparatuses or systems similar to the present invention (for example, abnormal action detection and specific pattern analysis, motion/posture based multiplayer game, user's interface of smart TV using motion recognition, dance and golf posture correction, user behavior pattern analysis, learning through activity recognition, etc.).

For example, the embodiment may be used as an apparatus or model for automatically measuring developments of children by evaluating how well children explain a specific thing with his or her action, or an apparatus or model for making a preliminary screening of diseases such as autism by recognizing abnormal action defined in advance.

Figure 2:
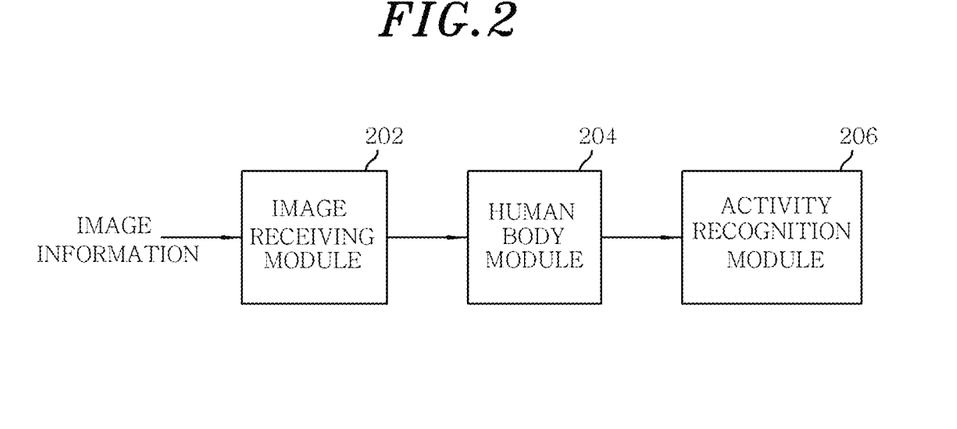
FIG. 2 is a block diagram of an apparatus for providing an activity recognition based application service in accordance with the present invention.

FIG. 2 is a block diagram of an apparatus for providing an activity recognition based application service in accordance with the present invention, which includes an image receiving module 202, a human body detection module 204 and an activity recognition module 206.

Referring to FIG. 2, the image receiving module 202 receives a series of images from a 3-dimensional camera installed in an activity recognition apparatus, that is, collects a depth image needed for an activity recognition and then transfers the depth image to the human body detection module 204. Of course, although the image receiving module 202 may receive all of depth images including 2D RGB image and distance information from a 3D camera, the image receiving module 202 will be described to receive the depth image only since action of the human body is recognized using the depth image only in the present embodiment.

Further, the human body detection module 204 detects a human body from the collected depth image. More specifically, the human body detection module 204 detects a position of the human body (for example, an actor in the above mentioned scenario) from the input image using the depth image. The detected position information of the human body is transferred to the activity recognition module 206.

Next, the activity recognition module 206 recognizes an action of the human body using an SVM (Support Vector Machine) classifier. In other words, the activity recognition module 206 extracts a 3-dimensional action volume from the human body and recognizes an action of the human body based on the extracted 3-dimensional action volume and a previously learned action model.

That is, what is recognized is what an action composed of a group of a series of postures taken by the human body (actor) is. Each action to be recognized is learned in advance on a problem-area basis, and the previously learned action model and a label of the relevant action may be stored in an action learning database. For this, the activity recognition module 206 includes such components as shown in FIG. 3.

Figure 3:
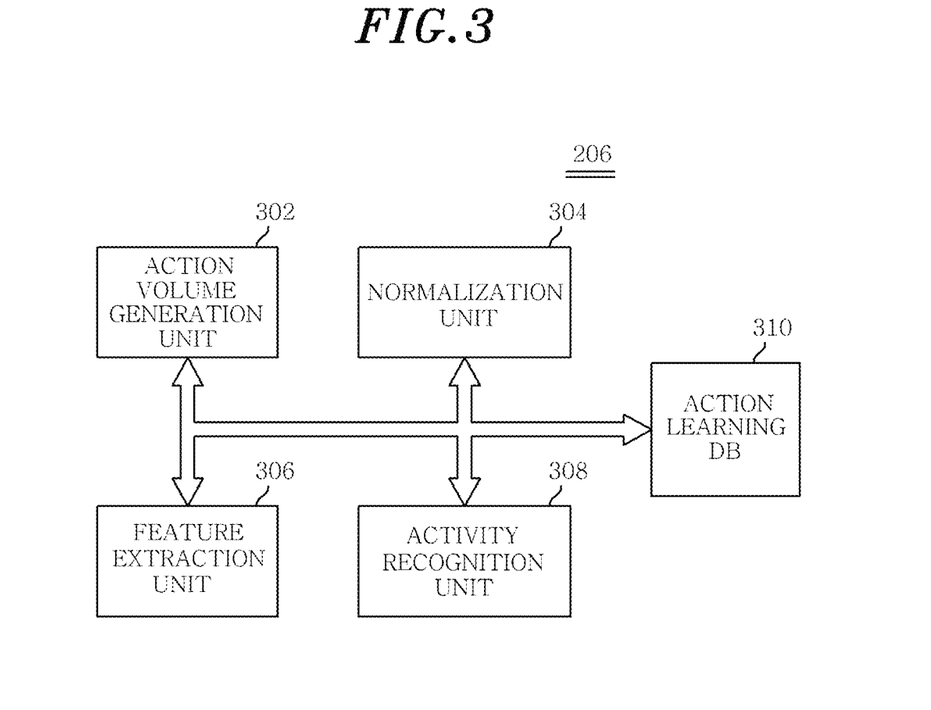
FIG. 3 is a detailed block diagram of an activity recognition module shown in FIG. 2.

FIG. 3 is a detailed block diagram of the activity recognition module shown in FIG. 2. The activity recognition module includes an action volume generation unit 302, a normalization unit 304, a feature extraction unit 306, an activity recognition unit 308 and an action learning DB 310.

Referring to FIG. 3, the action volume generation unit 302 generates a 3-dimensional action volume by accumulating all depth images from when the human body (for example, the actor in the above mentioned scenario) starts to take an action until the human body ends to take an action.

In other words, the action volume generation unit 302 may generate a 3-dimensional action volume using the Equation 1 below.

$$V(i, j, t) = \begin{cases} D(i, j, t), & \text{if } V(i, j, t-1) = 0 \\ \min(D(i, j, t), V(i, j, t-1)), & o \cdot w \end{cases} \quad \text{Eq. 1}$$

In the Equation 1, the V(i,j,t) denotes a depth value in a position (i,j) of an action volume depth image at a time point t, and the D(i,j,t) denotes a depth value in a position (i,j) of an input depth image at a time point t. In this case, the action volume generation unit 302 generates a 3-dimensional action volume at all points where the D(i,j,t) is not 0 (zero).

Figure 6A:
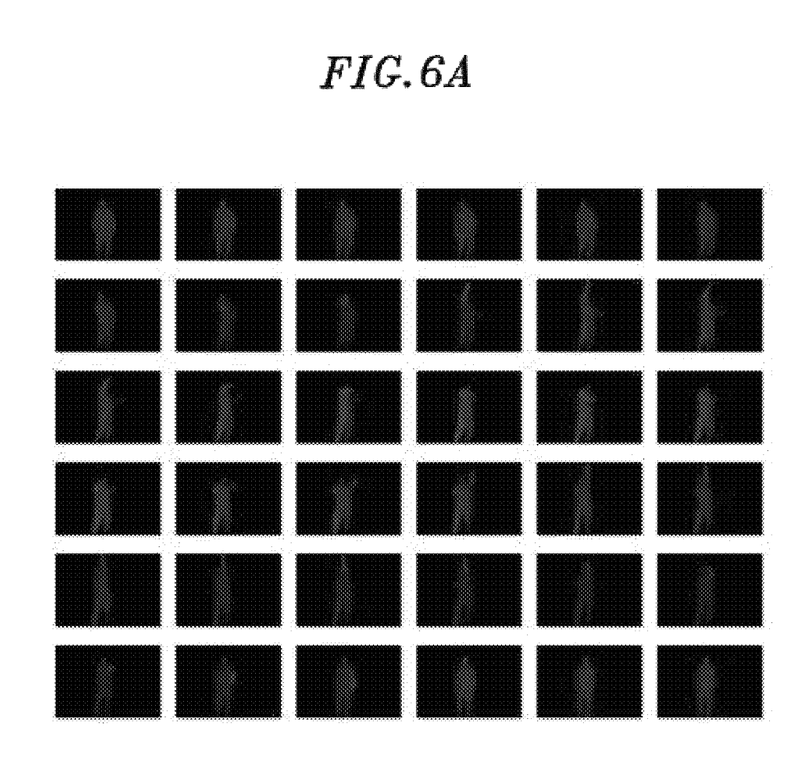
FIGS. 6A and 6B show a simulation result illustrating how a plurality of images are accumulated to finally generate one action volume that is a depth image.
Figure 6B:
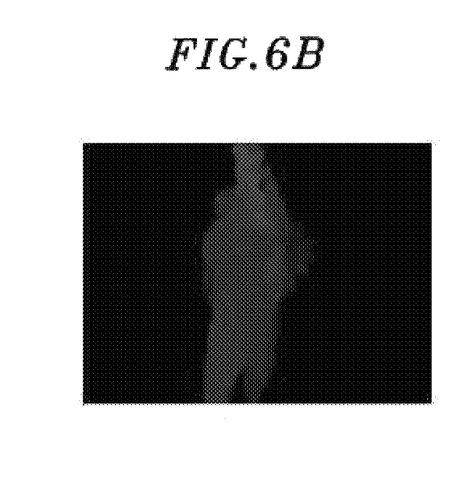

That is, the action volume generation unit 302 accumulates a plurality of depth images as shown in FIG. 6A, for example, and finally generates a 3-dimensional action volume that is one depth image as shown in FIG. 6B, for example. The 3-dimensional action volume has a separate shape for each action so that it may be suitable to extract the feature.

Meanwhile, the normalization unit 304 normalizes the 3-dimensional action volume generated by the action volume generation unit 302 in a predetermined scale. More specifically, the normalization unit 304 cuts the 3-dimensional action volume in the minimum square area in which an action volume is included, and resizes the cut depth image in a regular scale. For example, it may be possible that the distance between the human body (e.g., the actor) and a camera is not fixed, and each actor may take different scales for the same action. Accordingly, the action volume shown in the image may also be different in its scale, and the normalization is performed to correct such difference.

Next, the feature extraction unit 306 extracts a feature of each action volume. That is, the feature extraction unit 306 extracts the feature using a 3D LBP (Local Binary Pattern) by comparing depth values of each pixel for the 3-dimensional action volume normalized by the normalization unit 304, for example, the action volume shown in FIG. 7.

Figure 7:
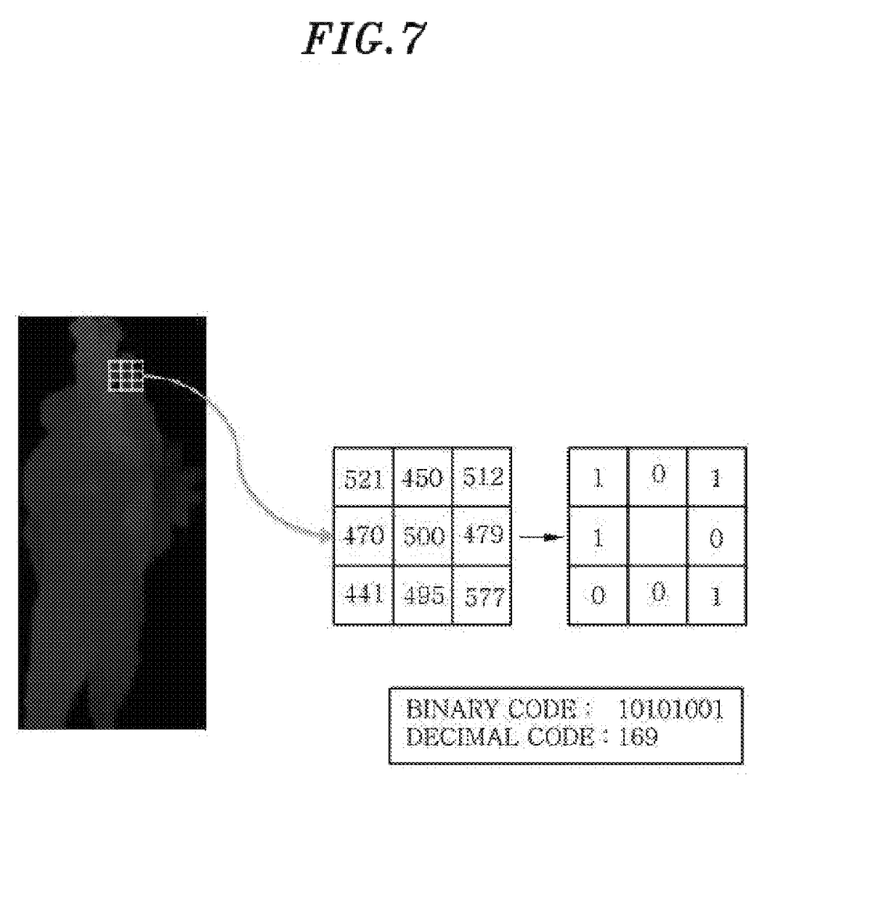
FIG. 7 is a conceptual diagram illustrating a process to extract a feature of the generated action volume using a 3D LBP.

For example, as shown in FIG. 7, a 3×3 window of the normalized action volume is sequentially scanned starting from the upper-left pixel to the lower-right pixel across the entire image, and one pixel located in the center of the window is compared with neighboring values and then converted into a decimal code value.

For example, as shown in FIG. 7, when comparing a depth value (or depth information) of 500 located in the center of the window with that of a neighboring pixel, if the depth value of the neighboring pixel is more than 500, a digit '1' is assigned, and a digit '0', otherwise. As shown in FIG. 7, for a depth of 521, a digit of 1 is assigned; for a depth value of 450, a digit of 0 is assigned; and for a depth value of 512, a digit of 1 is assigned. A binary code of total 8 digits is obtained by mapping each depth value into 1 or 0 in the clockwise direction. Such a binary code may be converted into a decimal code, and the decimal code value finally becomes a feature value in its relevant pixel position.

In other words, the feature extraction unit 306 extracts one feature vector with respect to one action volume using the 3D LBP that generates one decimal code by comparing depth values of the respective pixels one another.

Next, the activity recognition unit 308 compares the feature extracted by the feature extraction unit 306 and the learning feature of the previously learned action model stored in the action learning DB 310, and then recognizes an action label having the most similar learning feature to the extracted feature as an action of the human body. That is, the activity recognition unit 308 outputs a label of the most similar action model to the action currently taken by the human body (e.g., the actor) as a recognized action.

For this, the action learning DB 310 has previously learned action models for each problem area, their learning features and action labels, and the previously learned action models may be generated using an SVM learning classifier.

Next, a description will be made in detail on a series of operations providing a high-level intelligent application services (for example, an edutainment service) based on an activity recognition of a human body using an application service providing apparatus of the present invention having such construction as described above.

Figure 4:
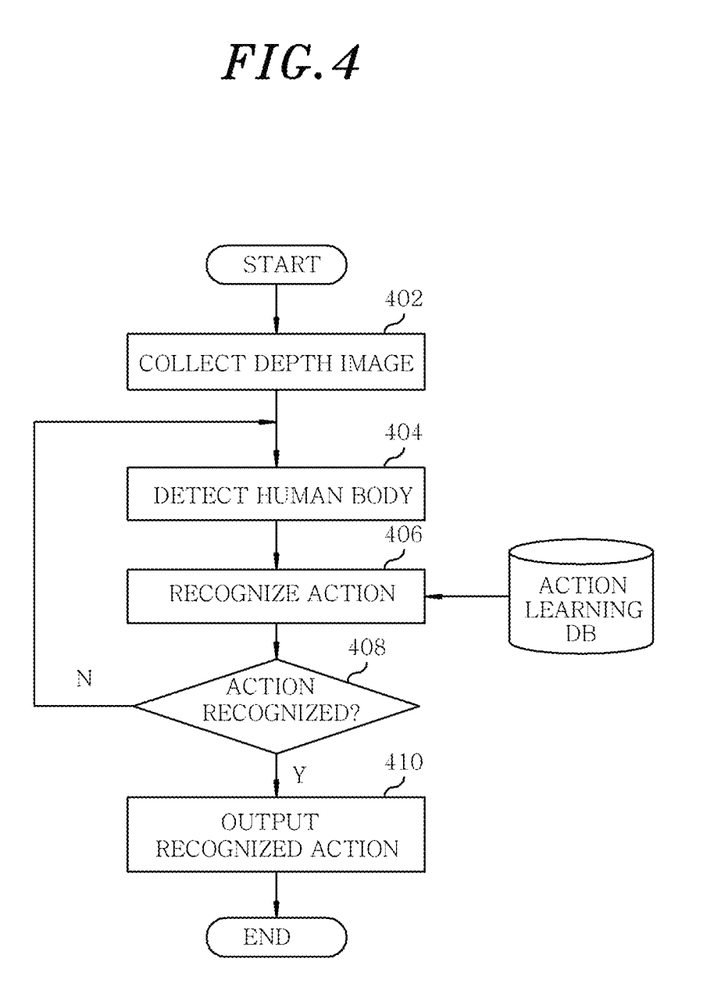
FIG. 4 is a flowchart illustrating a main process to recognize an action of an actor using a previously learned action model to provide an application service in accordance with the present invention.

FIG. 4 is a flowchart illustrating a main process to recognize an action of an actor using a previously learned action model to provide an application service in accordance with the present invention.

Referring to FIG. 4, when receiving a series of images from a 3D camera installed in the activity recognition apparatus, the image receiving module 202 collects the inputted depth images and transfers them to the human body detection module 204 in block 402.

In response thereto, the human body detection module 204 detects the human body from the collected depth images, that is, detects a position of the human body (for example, the actor) from the inputted images using the depth images, and then transfers them to the activity recognition module 206 in block 404.

Next, the activity recognition module 206 recognizes an action of the human body (the actor) using an SVM classifier. That is, a 3-dimensional action volume is extracted from the human body and an action of the human body is recognized based on the extracted 3-dimensional action volume and the previously learned action model stored in the action learning DB in block 406. A detailed process to recognize the action of the human body based on the 3-dimensional action volume and the previously learned action model will be described in detail below with reference to FIG. 5.

That is, the activity recognition module 206 recognizes the action of the human body until the action is not recognized any more, that is, until the action ends in block 408, and outputs the recognized action when an activity recognition of the human body ends in block 410.

Figure 5:
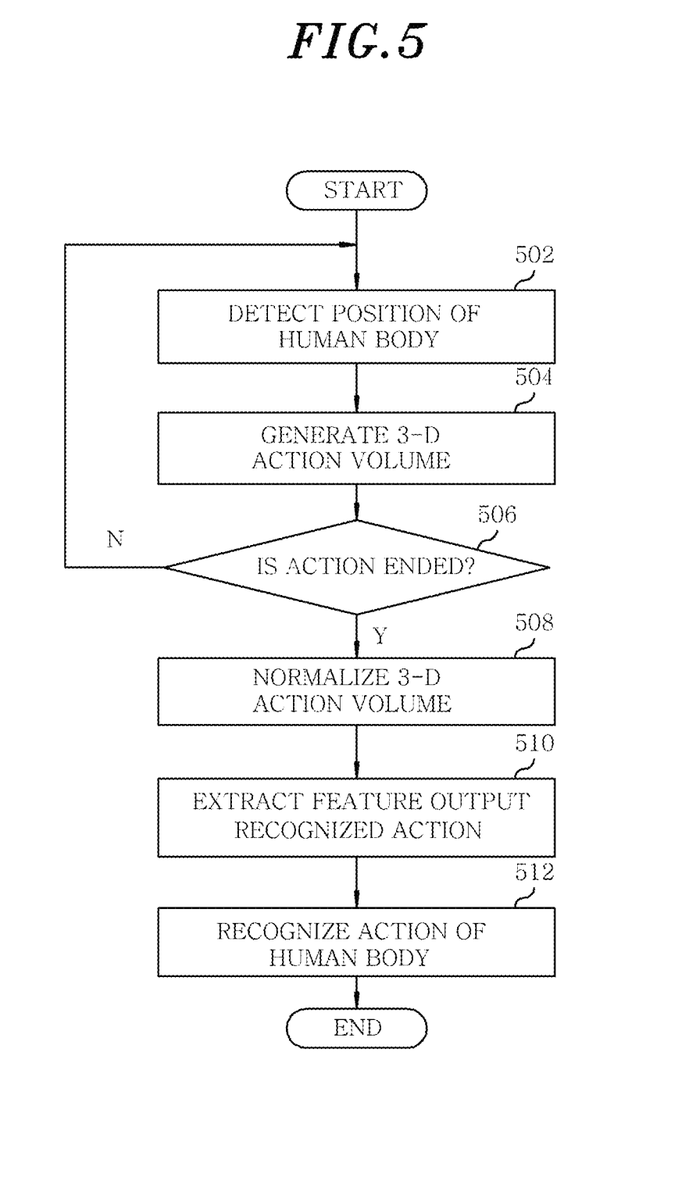
FIG. 5 is a flowchart illustrating a detailed main process of the activity recognition shown in FIG. 4.

FIG. 5 is a flowchart illustrating a detailed main process of the activity recognition shown in FIG. 4.

Referring to FIG. 5, the action volume generation unit 302 in the activity recognition volume 206 detects a position of the human body (e.g., the actor) when the human body starts to take an action in block 502, and then generates a 3-dimensional action volume in block 504.

Next, it is checked whether the action of the human body is ended in block 506. By repeatedly performing the process of blocks 502 to 506, all depth images from when the human body starts to take an action until it ends to take an action are accumulated so that a 3-dimensional action volume may be generated. That is, the 3-dimensional action volume may be generated using the mathematical equation 1 described above.

For example, by accumulating a plurality of depth images as shown in FIG. 6A, a 3-dimensional action volume of a depth image is finally generated as shown in FIG. 6B, for example. Here, the 3-dimensional action volume may have a separate shape for each action so that it is suitable to extract features.

Next, the normalization unit 304 normalizes the generated 3-dimensional action volume in a predetermined scale, more specifically, normalizes the 3-dimensional action volume by cutting the 3-dimensional action volume in the minimum square area including an action volume and resizing the cut depth image in a regular scale in block 508.

Subsequently, the feature extraction unit 306 extracts a feature for each action volume by comparing depth values of each pixel with respect to the normalized 3-dimensional action volume one another, that is, extracts the feature using the 3D LBP in block 510. That is, one feature vector is extracted for one action volume using the 3D LBP that generates one decimal code by comparing depth values of each pixel one another.

Finally, the activity recognition unit 308 compares the extracted feature and a learning feature of the previously learned action model stored in the action learning DB 310, and then recognizes an action label having the most similar learning feature to the extracted feature as an action of the human body, that is, outputs the label of the most similar action model to an action currently taken by the human body as a recognized action in block 512.

As mentioned above, in accordance with an embodiment of the present invention, it is possible to provide an intelligent application service model of a relatively higher level by detecting a 3-dimensional action volume from depth information of collected image information and recognizing an action of a human body based on the detected 3-dimensional action volume and a previously learned action model, thereby extensively applying to a variety of edutainment fields.

The combinations of the each block of the block diagram and each operation of the flow chart may be performed by computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in a computer usable memory or computer readable memory which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions performed by the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences in the appended drawings may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. That is, the exemplary embodiments disclosed herein are not used to limit the technical idea of the present invention, but to explain the present invention, and the scope of the technical idea of the present invention is not limited to these embodiments.

Therefore, the scope of protection of the present invention should be construed as defined in the following claims and changes, modifications and equivalents that fall within the technical idea of the present invention are intended to be embraced by the scope of the claims of the present invention.

What is claimed is:

1. An apparatus for providing an activity recognition based application service, comprising;

an image receiving module that collects a depth image provided from a camera and transfers the depth image to a human body detection module;

the human body detection module that receives the depth image from the image receiving module to detect a position of a human body from the depth image and transfers information of the position to an activity recognition module; and the activity recognition module that receives the information of the position from the human body detection module to recognize an action of the human body on the basis of a comparison between a feature of a three-dimensional action volume extracted from the human body and a learning feature of a previously learned action model.

2. The apparatus of claim 1, wherein the activity recognition module recognizes the action of the human body using a support vector machine classifier.

3. The apparatus of claim 1, wherein the activity recognition module comprises:

an action volume generation unit that generates the three-dimensional action volume by accumulating all the depth images from when the human body starts to take an action until the human body ends to take the action;

a normalization unit that normalizes the generated three-dimensional action volume in a predetermined scale;

a feature extraction unit that extracts the feature of the three-dimensional action volume by comparing depth values of each pixel of the normalized three-dimensional action volume with one another;

an action learning database that stores the learning feature and an action label for the previously learned action model; and an activity recognition unit that compares the extracted feature with the learning feature of the previously learned action model in the action learning database to determine the action label of the learning feature that is most similar to the extracted feature as the action of the human body.

4. The apparatus of claim 3, wherein the action volume generation unit generates the three-dimensional action volume using the following equation, $$V(i, j, t) = \begin{cases} D(i, j, t), & \text{if } V(i, j, t-1) = 0 \\ \min(D(i, j, t), V(i, j, t-1)), & o \cdot w \end{cases}$$

where V(i,j,t) denotes a depth value of the action volume depth image in its position (i,j) at a time point t, and D(i,j,t) denotes a depth value of the input depth image in its position (i,j) at the time point t.

5. The apparatus of claim 4, wherein the action volume generation unit generates the three-dimensional action volume in all positions where the D(i,j,k) is not zero (0).

6. The apparatus of claim 3, wherein the feature extraction unit extracts the feature using a three-dimensional local binary pattern.

7. The apparatus of claim 3, wherein the previously learned action model is generated using a support vector machine learning classifier.

8. A method for providing an activity recognition based application service, the method comprising:

collecting a depth image;

detecting a position of a human body from the collected depth image;

detecting a three-dimensional action volume from information of the position of the human body; and recognizing an action of the human body on the basis of a comparison between a feature of the three-dimensional action volume and a learning feature of a previously learned action model.

9. The method of claim 8, wherein said recognizing the action of the human body comprises:

recognizing the action of the human body using a support vector machine classifier.

10. The method of claim 8, wherein said recognizing the action of the human body comprises:

generating the three-dimensional action volume by accumulating all the depth images from when the human body starts to take an action until the human body ends to take the action;

normalizing the generated three-dimensional action volume in a predetermined scale;

extracting a feature of the three-dimensional action volume by comparing depth values of each pixel for the normalized three-dimensional action volume with one another; and comparing the extracted feature with the feature of the previously learned action model to determine an action label of the learning feature that is most similar to the extracted feature as the action of the human body.

11. The method of claim 10, wherein the three-dimensional action volume is generated using the following Equation, $$V(i, j, t) = \begin{cases} D(i, j, t), & \text{if } V(i, j, t-1) = 0 \\ \min(D(i, j, t), V(i, j, t-1)), & o \cdot w \end{cases}$$

where V(i,j,t) denotes a depth value of the action volume depth image in its position (i,j) at a time point t, and D(i,j,t) denotes a depth value of the input depth image in its position (i,j) at the time point t.

12. The method of claim 10, wherein the feature is extracted using a three-dimensional local binary pattern.

* * * * *